June 29, 1971     L. P. VELOZ     3,589,862

STORAGE APPARATUS FOR WATER PURIFICATION SYSTEM

Filed May 15, 1968

INVENTOR.
LOUIS P. VELOZ
BY Jerry E. Turner
ATTORNEY

United States Patent Office 3,589,862
Patented June 29, 1971

3,589,862
STORAGE APPARATUS FOR WATER PURIFICATION SYSTEM
Louis P. Veloz, 500 S. Madison Ave.,
Pasadena, Calif. 91106
Filed May 15, 1968, Ser. No. 729,312
Int. Cl. C02b 3/02; A61l 3/00; B67d 5/54
U.S. Cl. 21—102                     12 Claims

ABSTRACT OF THE DISCLOSURE

An expandable sterilized bag in a storage tank is secured to inlet and outlet connections so that purified water entering the tank is confined solely within the bag. The top of the tank is closed so that air trapped therein limits the level to which water in the bag can rise. Closure of the top of the tank is effected by an inverted cup having its rim forced against a seal around an opening in the top of the tank, such cup supporting an ultraviolet lamp above a quartz plate that extends across the opening.

BACKGROUND OF THE INVENTION

(1) Field of the invention

This invention relates to water purification systems, and more particularly to novel storage apparatus for water produced by such a system.

(2) Description of the prior art

The frame of reference for the invention resides in water purification systems which use so-called reverse osmosis devices, and in which purified water is directed into a closed tank. In such a system, the osmosis unit is connected to the cold water faucet, from which water passes through the unit and into the closed tank. The tank has an outlet valve or faucet from which one can obtain a supply of the purified water.

In such a system, water from the osmosis unit enters the tank to a level which is determined by the pressure of the air trapped in the top of the tank. Further, it is intended for such a system that the pressure of the trapped air is sufficient to cause a substantial flow of water out of the tank when the outlet valve is open. However, a serious drawback is that when such a system is placed into operation, the oxygen in the trapped air is absorbed by the purified water. Thus, the desired pressure for limiting the water level and for aiding water flow through the outlet valve is lost.

Heretofore, it has been attempted to minimize such oxygen absorption by placing in the tank a float in the form of a disc only slightly less in diameter than the inner diameter of the tank. However, such floats are of only limited effectiveness, because the oxygen in the trapped air eventually passes around the edge of the float and is absorbed in the water.

SUMMARY OF THE INVENTION

The invention embraces a limp, expandable plastic bag which is connected between the inlet and outlet of a storage tank for purified water, whereby purified water entering the tank is confined entirely within the bag, thereby eliminating the possibility of absorption into the water of oxygen from the air above the bag. In a trapped air water purification system, such arrangement insures that the water will not exceed a predetermined level in the tank, and insures a sufficient air pressure to aid in maintaining a satisfactory flow of water out of the tank when the outlet valve is opened.

An additional feature resides in the provision of an ultraviolet lamp source releasably secured in an opening in the top of the tank, thereby providing means for additionally sterilizing the water within the bag.

DESCRIPTION OF PREFERRED EMBODIMENT

Figure 1:
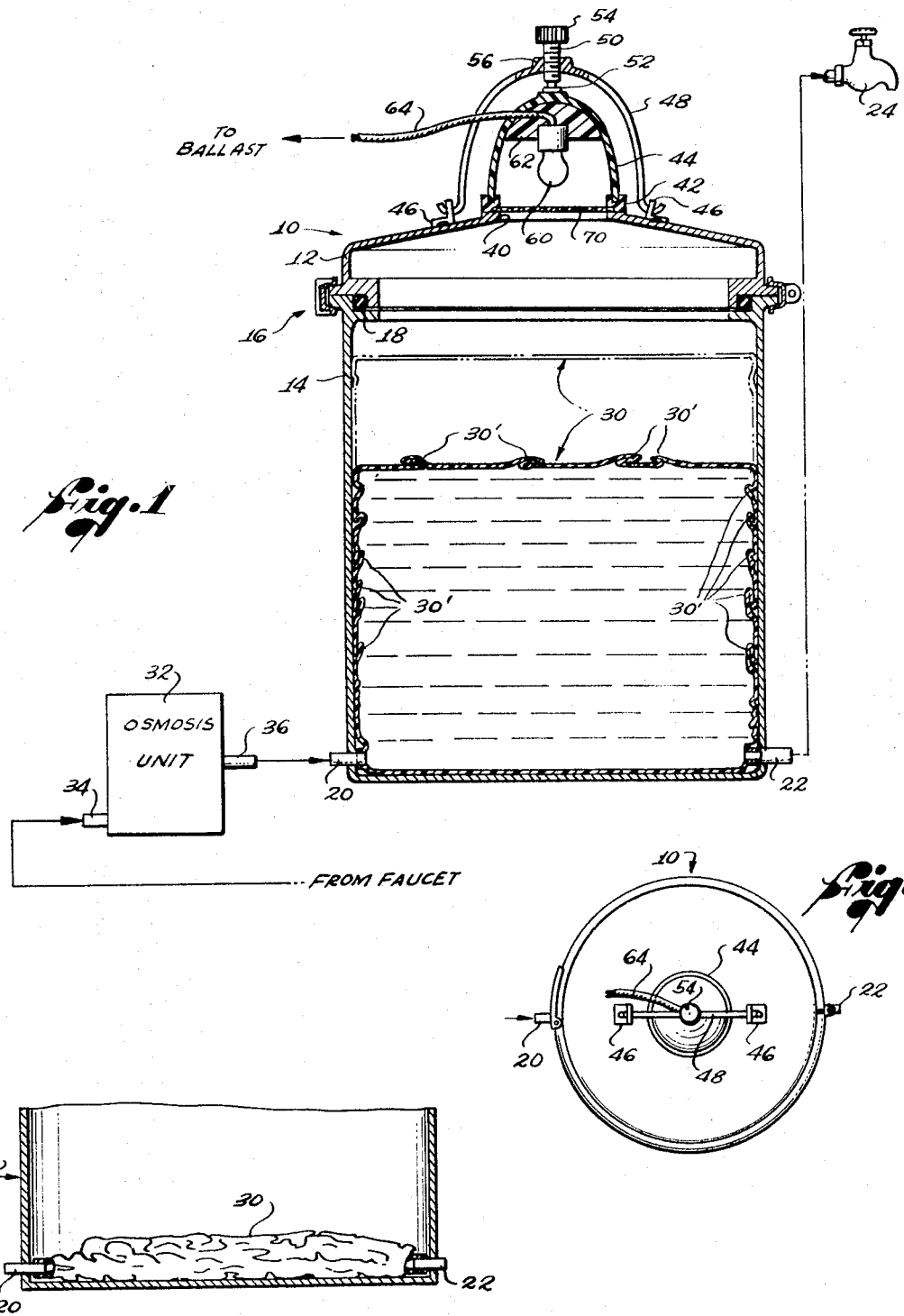
FIG. 1 is a sectional view of a storage apparatus in accordance with my invention, showing a sterilized plastic bag partly filled with purified water from an osmosis unit, and showing an ultraviolet light source releasably covering an opening in the top of the tank.
Figure 3:
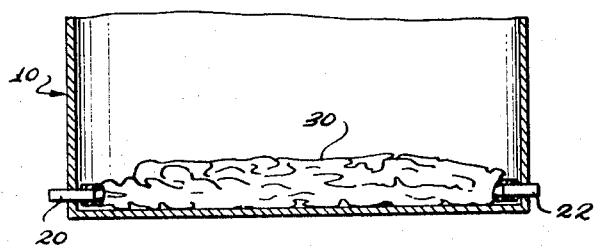
FIG. 3 is a sectional view of the lower portion of the tank, showing the bag folded on the bottom of the tank in the condition wherein there is no water in the bag.

Referring to FIG. 1, a tank 10 is formed of upper and lower sections 12, 14 which are releasably secured together, as via a ring clamp 16 and an O-ring 18, so as to be airtight. Referring to FIG. 3 along with FIG. 1, the tank is provided with an inlet pipe nipple 20 through which to pass purified water, and an outlet nipple 22 to which an outlet valve or faucet 24 is connected for drawing water out of the tank. Inside the tank is a sterilized plastic bag 30, which preferably is a polypropylene bag, which has two tubular portions connected respectively to the inner ends of the nipples 20, 22. When the bag 30 is initially placed in the tank 10 (see FIG. 3), it is compressed so there is no air therein.

As shown in FIG. 1, an osmosis unit 32 is provided with an inlet type nipple 34 through which water from a faucet is directed into the unit, and an outlet nipple 36 through which water purified in the unit 32 is directed through the nipple 20 of the tank 10. The bag 30 unfolds as water enters therein. In FIG. 1, the bag 30 is shown in solid lines as expanded or unfolded to the point where the water level is approximately at the middle of the tank. At such point, the bag is shown with folds 30′, indicating that it can accommodate substantially more water. The dotted line position of the bag 30 indicates the maximum level to which water therein can rise, such maximum level being determined by the pressure of the air in the top of the tank.

In this latter connection, the bag 30 preferably is not completely filled out when the water therein has reached the predetermined maximum level. This arrangement insures that the bag will not be subjected to undue stresses and caused to rupture.

With my storage apparatus as thus far described, I eliminate the possibility of oxygen in the air above the bag entering the purified water. Accordingly, I eliminate the need for floats and other ineffective measures heretofore employed which at best only extend the time over which oxygen in storage tanks heretofore employed is absorbed into the purified water.

Figure 2:
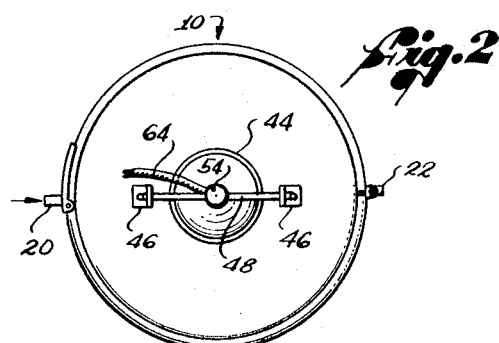
FIG. 2 is a top plan view of the tank of FIG. 1.

Also shown in FIG. 1 is unique means for further sterilizing water in the bag 30. Referring to FIGS. 1 and 2, the top of the tank 10 has an opening 40 around which is a ring seal or gasket 42 which, for example, may be a neoprene gasket. In the arrangement shown, the top surface of the gasket 42 is provided with a channel, into which is fitted the rim of an inverted plastic cup 44. Outboard of the gasket 42 are diametrically opposed, rigid angle elements 46 which are suitably secured, as by welding, to the top of the tank 10.

As shown, the angle elements 46 have upstanding arms with openings therein. Hooked into these openings are the curved ends of a substantially rigid bail element 48. Throughout its length, the bail 48 is spaced from the cup 44, and therefore can be swiveled on its ends about the cup. A rod 50 is threaded through the center of the bail, so that the inner end of the rod can engage and exert substantial force against the cup 44. If desired, the inner end of the rod can be flanged, fitted with a disc, or otherwise enlarged as at 52, to provide a substantial surface to engage the cup. A knurled knob 54 is fitted on the outer end of the rod 50 and suitably secured, as by a set screw, for unitary rotation with the rod.

If desired, substantial thread bearing surfaces between the rod 40 and the bail 48 may be provided by a tapped block 56 at the center of the bail. In this connection, the bail may be formed of curved rods which are welded to the block 56, or the bail may be formed of length of rod of sufficient diameter that its mid-point can be tapped to receive the rod 50. Other alternatives may readily suggest themselves to those skilled in the art. All that is required for such a bail is that it support a rod that can be turned in one direction so that its inner end presses against the cup 44, thereby to force it into airtight engagement with the gasket 42, and turned in the opposite direction to be disengaged from and free the bail to be swiveled free of the cup.

In this latter connection, after the cup is placed in position with its lip seated in the gasket 42, the bail is swiveled to a vertical position wherein the rod 50 is poised at the top of the cup, and then the rod is turned inwardly so that its inner end engages the cup. The rod 50 is turned inwardly with sufficient force to effect the desired airtight seal between the rim of the cup and the gasket. Thus, the upper end of the tank 10 is closed, thereby providing the trapped air pocket previously described for the closed type of water purification system.

Preferably, the cup 44 is formed of a translucent plastic, e.g., Lucite. Within the cup 44, I support an ultraviolet light source, shown as a lamp 60 having its socket potted in the cup by plastic material 62. The electrical connection 64 from the socket extends through the potting material 62 and to the exterior of the cup 44 for connection to the ballast for the ultraviolet lamp.

Below the lamp 60, I provide a quartz plate 70 across the opening 40 in the top of the tank. In the arrangement shown, the gasket 42 is shaped with an inner groove in which the peripheral portion of the quartz plate 70 is fitted. Thus, ultraviolet radiation from the lamp bulb 60 passes through the quartz plate 70 and sterilizes the air in the top of the tank and the water within the bag 30. Further, should the bag 30 rupture for any reason, the the quartz plate 70 sterilizes the air in the top of the tank and the water within the bag 30. Further, should the bag 30 rupture for any reason, the quartz plate 70 insures electrical isolation between the lamp and the water, and avoids the hazard of exposing the water to the mercury vapor of the lamp.

By making the cup 44 of translucent material, the assembly is one with which it can be visually detected whether the lamp 60 is illuminated. The cup is seen to glow while the lamp is illuminated, and the absence of such glow signifies that the lamp has burned out.

When it is ascertained that the lamp is burned out, all that is necessary is to unscrew the rod 50 to relieve the pressure on the cup 44, swivel the bail 48 out of the way, and lift the cup 44 off the gasket to unscrew the burned out lamp and replace it with a new one. Then the cup is again placed in position with its rim on the gasket 42, the bail 48 is raised, and the rod 50 is turned against the top of the cup to re-establish the airtight seal between the rim of the cup and the gasket.

From the foregoing, it will be apparent that various modifications can be made in the constructions illustrated and described without departing from the spirit and scope of my invention. Accordingly, I do not intend that my invention be limited, except in accordance with a reasonable interpretation of the appended claims.

I claim:

1. In combination:
a storage tank for purified water, said tank having a top opening;
a ring seal to surround said opening;
a removable quartz plate extending across said opening;
an inverted translucent cup;
an ultraviolet lamp supported in said cup above said quartz plate;
and means releasably holding said cup in position with its rim sealingly engaging said ring seal.

2. The combination comprising: a tank, a sterilized plastic bag inside said tank, inlet and outlet means for delivering purified water from the outside of said tank into the interior of said bag and then discharging said water from said bag to the exterior of the tank, said bag being constructed to confine said water therein and against contact with any air which may be present in the tank but outside of the bag, said bag being supported by said tank at both the bottom of the bag and its sides in a relation assuming a shape corresponding to a portion of the tank, said bag being expandable and collapsible to conform to the volume of water therein and being sufficiently freely flexible to collapse downwardly toward the bottom of the tank upon withdrawal of water therefrom, and means for emitting ultraviolet radiation into air trapped in the tank above said bag to sterilize it.

3. The combination as recited in claim 2, in which said last mentioned means emit said ultraviolet radiation through said air trapped in the tank above the bag and into water in said bag to sterilize them.

4. The combination comprising: a tank, a sterilized plastic bag inside said tank, inlet and outlet means for delivering purified water from the outside of said tank into the interior of said bag and then discharging said water from said bag to the exterior of the tank, said bag being constructed to confine said water therein and against contact with any air which may be present in the tank but outside of the bag, said bag being supported by said tank at both the bottom of the bag and its sides in a relation assuming a shape corresponding to a portion of the tank, said bag being expandable and collapsible to conform to the volume of water therein and being sufficiently freely flexible to collapse downwardly toward the bottom of the tank upon withdrawal of water therefrom, and means for emitting ultraviolet radiation into the water in said bag to sterilize it.

5. The combination of claim 4, in which said tank is a closed container confining a body of trapped air in an upper portion thereof above the bag in a relation determining the upper level to which water can rise in the bag by the pressure of said trapped air.

6. The combination of claim 5, in which said bag has a capacity to hold a greater volume of water than that present when the water reaches said upper level determined by the air pressure.

7. In combination: a tank having an inlet through which to direct purified water into the tank, and an outlet through which to draw off a supply of such water; a sterilized plastic bag inside said tank having a pair of openings connected respectively to said inlet and outlet, whereby purified water in the tank is confined within said bag and cannot absorb or be contacted by any components of air in the tank; said bag being expandable and collapsible to conform to the volume of water therein; said tank being a closed container in which the upper level for water entering the bag is determined by the pressure of air trapped in the top of the tank above said bag; said bag having a capacity to hold a greater volume of water than the volume of water that enters therein to such upper level; said tank having a top with an opening; a gasket on top of said tank extending around said opening; an inverted cup having its rim in sealing engagement with said gasket; and an ultraviolet lamp supported in said cup.

8. The combination of claim 7, including a quartz disc extending across said opening.

9. The combination of claim 7, including a bail mounted on top of the tank so as to swivel over said cup; and means extending between the center of said bail and the top of said cup for forcing the rim of said cup into sealing engagement with said gasket.

10. The combination of claim 9, including a quartz disc supported at its periphery by said gasket.

11. The combination of claim 9, wherein said lamp has a socket secured in the closed end of said cup with plastic potting material; and an electrical connection for said socket extending through said potting material and said cup.

12. The combination of claim 9, wherein said cup is made of translucent material.

References Cited

UNITED STATES PATENTS

| | | | |
|---|---|---|---|
| 2,075,696 | 3/1937 | Boerstler | 250—43 |
| 2,340,890 | 2/1944 | Lang et al. | 21—101UX |
| 2,470,806 | 5/1949 | Del Cueto | 21—101UX |
| 2,482,507 | 9/1949 | Rentschler et al. | 21—2X |
| 2,485,267 | 10/1949 | Ellner | 250—43 |
| 2,648,774 | 8/1953 | Whitlock | 250—43 |
| 2,844,727 | 7/1958 | Maciszewski et al. | 250—43 |
| 3,123,254 | 3/1964 | Rabby et al. | 222—105 |
| 3,218,979 | 11/1965 | Baldwin | 103—44 |
| 3,223,289 | 12/1965 | Bouet | 222—209 |
| 3,225,967 | 12/1965 | Heimgartner | 222—105X |
| 2,758,747 | 8/1956 | Stevens | 222—386.5X |

FOREIGN PATENTS

| | | | |
|---|---|---|---|
| 867,593 | 1/1953 | Germany | 21—102 |

JOSEPH SCOVRONEK, Primary Examiner

D. G. MILLMAN, Assistant Examiner

U.S. Cl. X.R.

222—386.5; 250—43